US006940409B1

(12) United States Patent
Green

(10) Patent No.: US 6,940,409 B1
(45) Date of Patent: Sep. 6, 2005

(54) FLUID FLOW DETECTOR

(75) Inventor: Timothy M. Green, Fenton, MO (US)

(73) Assignee: Potter Electric Signal Company, St. Louis, MO (US)

( * ) Notice: Subject to any disclaimer, the term of this patent is extended or adjusted under 35 U.S.C. 154(b) by 0 days.

(21) Appl. No.: 10/214,814

(22) Filed: Aug. 8, 2002

Related U.S. Application Data

(60) Provisional application No. 60/311,788, filed on Aug. 13, 2001.

(51) Int. Cl.[7] ............................................... G08B 21/00
(52) U.S. Cl. ................. 340/603; 340/286.05; 340/606; 73/290 V; 73/861.18; 73/861.23; 702/48; 702/54
(58) Field of Search .......................... 340/606, 286.05, 340/603, 605, 683, 870.16; 73/290 V, 861.18, 861.23, 40, 40.5 A, 152.58, 592, 40.5 R; 702/136, 54, 48, 51

(56) References Cited

U.S. PATENT DOCUMENTS

| | | | | |
|---|---|---|---|---|
| 3,580,092 A | | 5/1971 | Scarpa ..................... 73/861.18 |
| 4,031,826 A | * | 6/1977 | Gemmell et al. ............. 367/81 |
| 4,286,470 A | | 9/1981 | Lynnworth ................... 73/637 |
| 4,696,191 A | * | 9/1987 | Claytor et al. ................ 73/600 |
| 4,736,763 A | | 4/1988 | Britton et al. ................ 137/10 |
| 4,905,897 A | | 3/1990 | Rogers et al. ................. 239/1 |
| 4,922,233 A | * | 5/1990 | Twerdochlib ............... 340/606 |
| 5,040,409 A | | 8/1991 | Kiewit ..................... 73/40.5 A |
| 5,175,530 A | | 12/1992 | Eng ............................ 340/606 |
| 5,361,636 A | | 11/1994 | Farstad et al. ................ 73/592 |
| 5,409,037 A | | 4/1995 | Wheeler et al. ............. 137/551 |
| 5,502,652 A | * | 3/1996 | Hoggatt et al. ............. 702/136 |
| 5,616,829 A | | 4/1997 | Balaschak et al. ............. 73/46 |
| 5,999,107 A | * | 12/1999 | Cooper et al. ......... 340/870.16 |
| 6,025,788 A | | 2/2000 | Diduck ................... 340/870.16 |
| 6,158,288 A | | 12/2000 | Smith ...................... 73/861.25 |
| 6,480,793 B1 | * | 11/2002 | Martin ........................ 702/45 |
| 6,568,271 B2 | * | 5/2003 | Shah et al. .................... 73/599 |

OTHER PUBLICATIONS

L. Lynnworth, "Clamp–On Flowmeters for Fluids", SENSORS, Aug. 2001.

* cited by examiner

*Primary Examiner*—Davetta W. Goins
(74) *Attorney, Agent, or Firm*—Lewis, Rice & Fingersh, L.C.

(57) ABSTRACT

A method and apparatus for monitoring fluid flow in a pipe or at an exit of the pipe and detecting a fault. The system includes an acoustic generator which is activated by the fluid flowing in the pipe or at the exit of the pipe. The acoustic generator sends an acoustic signal, which may have a distinctive signature, through the fluid flowing in the pipe. The acoustic signal is received by a remote upstream acoustic receiver and is translated into an electric signal supplied to a signal processor.

19 Claims, 2 Drawing Sheets

FLUID FLOW DETECTOR

This application claims priority from provisional application Ser. No. 60/311,788, filed Aug. 13, 2001 for Noninvasive Emission Monitoring System.

BACKGROUND OF THE INVENTION

1. Field of the Invention

The present invention relates to a method and apparatus for monitoring fluid flow in a pipe or at an exit of a pipe, including sprinkler heads and leaks or breaks in the pipe.

2. Brief Description of the Prior Art

In an automatic fire sprinkler system in a commercial building, the water system servicing the sprinkler system is separate from the water system otherwise servicing the building. The presence of water flow in the sprinkler system is an alarm condition indicating that one or more of the sprinkler heads has fired. For the purpose of sounding an alarm, it is not necessary to determine how much flow is occurring, the presence of any detectable flow indicates a problem.

Typically flow detectors in an automatic fire sprinkler system are installed in the main water pipe as it enters the building. In simplest form, the flow detector comprises a flow switch including a large paddle inserted into the pipe. The slightest water flow in the pipe turns the paddle causing a switch to contact activating an alarm control circuit. There are also electronic flow detectors which can be inserted into the pipes for detecting flow. In the case of both mechanical and electronic flow detectors, one or more foreign elements is necessarily interposed in the path of the fluid whose flow is to be monitored. This has the disadvantage of distorting the flow one wishes to monitor; and the further disadvantage of necessitating the opening up of the pipe section to be monitored, prior to the monitoring operation, and either inserting the necessary functional elements or an additional pipe section, containing these elements, into the pipe system, which must then be resealed. Such an arrangement is costly and inflexible for detecting flow on a complex pipe system. Neither the mechanical nor the electronic flow detectors presently on the market provide any information regarding which sprinkler head has fired or how many sprinkler heads have fired which information is invaluable to the system operator or emergency personnel responding to the alarm.

There are other situations where the presence or absence of flow needs to be monitored. For example, the absence of flow through a spray nozzle may be significant to a farmer or a groundskeeper. If one or more of the nozzles fails to operate or operates unevenly, a part of the ground will not receive its proper dose of the liquid being spayed. Supervisory devices for detecting the presence or absence of flow through pipes in industrial processes are also needed. While it is possible to place a microphone or other acoustic sensor on the pipe or sprinkler to be monitored, in the systems known and used in the prior art, the information must be passed through a hard wired electrical system or radio transmitted to a central control panel.

There are electroacoustic fluid flow meters for determining the amount of fluid flowing through a pipe using contrapropagating transmission, reflection or Doppler methods. In contrapropagating transmission a pair of acoustic transducers are spaced a short distance apart on the pipe. By measuring the difference in time it takes an acoustic signal to pass between upstream and downstream transducers, it is possible to determine the rate at which the fluid is flowing through the pipe. For the purpose of the present invention, however, a flow detector, not a flow meter is required.

BRIEF SUMMARY OF THE INVENTION

In view of the above, it is an object of the present invention to provide an apparatus and a method for detecting flow or the absence of flow in a pipe or the exit of a pipe using a purposeful acoustic signal sent through the fluid by an acoustic generator positioned near the problem, said signal received by a remote central acoustic receiver. It is another object to provide a fluid flow detector that is simpler, less complex, and therefore, less expensive than devices of the prior art. Another object is to provide a fluid flow detector that can be installed non-intrusively such that it can be used to update and upgrade existing systems. It is also an object to provide a fluid flow detector that can be used in combination with prior art fluid flow detectors to provide additional information regarding a flow problem. Other objects and features of the invention will be in part apparent and in part pointed out hereinafter.

In accordance with the invention, an apparatus for monitoring fluid flow through a pipe or at the exit of a pipe includes:

An acoustic generator acoustically coupled to the pipe or at the exit of the pipe. The acoustic generator is activated by the fluid flowing through the pipe or the exit of the pipe and generates purposeful upstream acoustic vibrations in the fluid flowing through the pipe, said acoustic vibrations forming an acoustic signal;

An acoustic receiver acoustically coupled to a remote upstream portion of the pipe. The acoustic receiver is constructed to respond to at least a portion of the acoustic signal generated by the acoustic generator and to produce an electric output signal;

A signal processing means arranged to receive the electric output signal from the acoustic receiver and to detect a deviation in said electrical output signal from a predetermined normal signal by a value greater than a predetermine value indicating a fault in the flow of fluid through the pipe or at the exit of the pipe; and, A display means for indicating the fault.

The above described apparatus can be used to monitor flow or the absence of flow through the pipe or the exit of the pipe. The purposeful acoustic vibrations received by the acoustic receiver can be used by the signal processing means to uniquely identify the acoustic generator. If the placement of the acoustic generator is known then the locus of the problem can be determined. If a unique purposeful acoustic signal is assigned to each acoustic generator, the number of acoustic generators that have been activated can be determined by the signal processing means from the signals received by the acoustic receiver and the magnitude of the problem can also be determined.

The invention summarized above comprises the constructions and methods hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

A system for monitoring fluid flow and detecting a fault in accordance with the present invention encompasses both an apparatus 10 and a method. In major part, apparatus 10 includes an acoustic generator 12, an acoustic receiver 14 and a fault signal processing means 16. The present invention can be used to detect flow of fluids in a pipe or at an exit of the pipe. It is to be understood that the term "fluid" includes liquids, gases and flowable particulate matter. It will also be understood that the word "pipe" is not limited to those tubular structures commonly referred to as pipes, but includes structures that are differently shaped or either smaller or larger than conventional pipes. For instance, the present invention is applicable to structures including conduits, tubes, and vessels regardless of cross-sectional shape or length.

Figure 1:
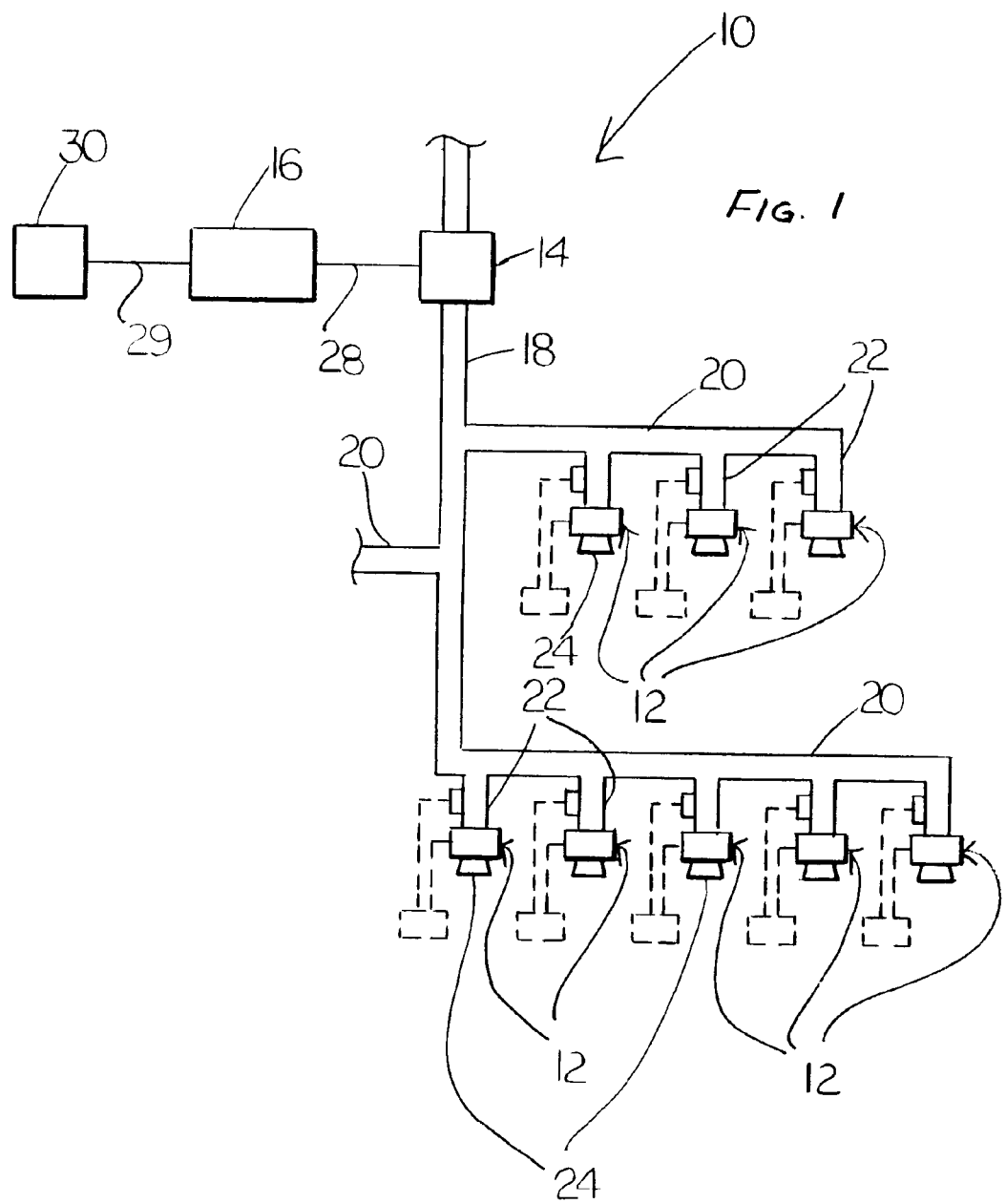
FIG. 1 is a schematic view of a system for monitoring fluid flow and detecting a fault in accordance with the present invention installed in an automatic fire sprinkler system.
Figure 2:
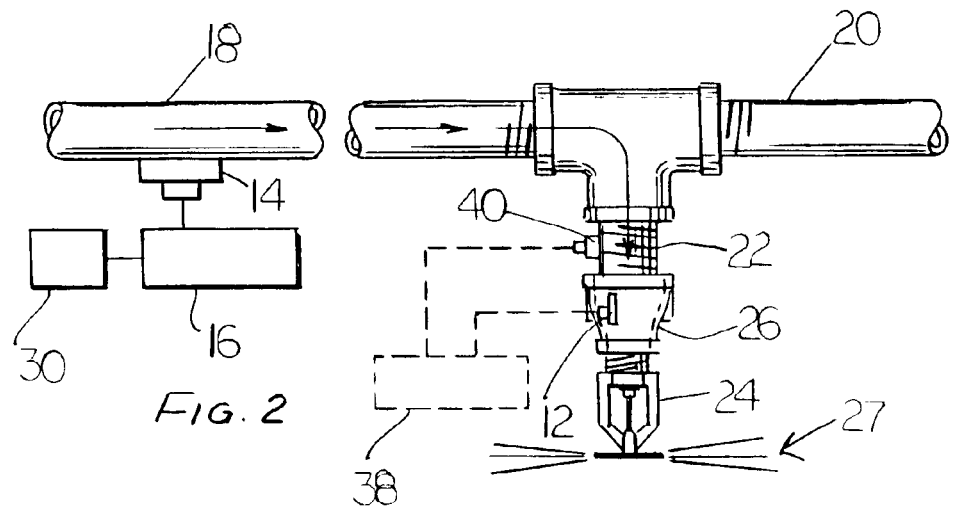
FIG. 2 is an enlarged schematic view showing a portion of the fire sprinkler system centered on the system for monitoring fluid flow and detecting a fault.

As illustrated in FIGS. 1 and 2, apparatus 10 is installed on a typical automatic fire sprinkler system. Automatic fire sprinkler system includes a network of pipes that carry a fire suppression fluid, e.g., water, to each room in a building. A main pipe 18 is connected to a plurality of lateral pipes 20. Lateral pipes 20 are connected to conduits 22 which carry the fluid from the pipes to sprinkler heads 24 strategically located in different rooms. The position and orientation of each sprinkler head 24 is typically maintained in place by a support mechanism including a coupling 26. When the room reaches an elevated temperature due to a fire, sprinkler head 24 is activated allowing a stream of fire suppression fluid to be directed over the intended area of coverage. The fluid exits the sprinkler head 24 under high pressure at 27 and the shearing action of the fluid flowing through the sprinkler head gives rise to local vibrations.

Acoustic generator 12 is acoustically coupled to sprinkler head 24 or to coupling 26, conduit 22 or lateral pipe 20 close to the flow. Acoustic generator 12 is activated by the shearing action of the fluid flow through sprinkler head 24 and transmits a purposeful acoustic signal, as distinguished from the vibrations generated by the shearing action of the fluid, and sends the purposeful signal through the fluid flowing through the network of pipes to acoustic receiver 14. The purposeful signal can be audible, subsonic or ultrasonic. Acoustic generator 12 may be an acoustic transducer such as a piezoelectric transducer, a microphone or such other acoustic generator as will occur to those skilled in the art. Acoustic generator 12 may be placed externally or internally on sprinkler head 24, coupling 26, conduit 22 or lateral pipe 20.

Acoustic receiver 14 is acoustically coupled, either externally or internally, to the pipe network remote from acoustic generator 12 such as on main water pipe 18 as it enters the building. Acoustic receiver 14 is capable of receiving the purposeful acoustic signal sent by acoustic generator 12. Acoustic receiver 14 may be an accelerometer, including piezoelectric, piezoresistive and electromagnetic types, as well as pressure transducers and microphones and such other acoustic receivers as will occur to those skilled in the art. Acoustic receiver 14 is constructed to respond to at least a portion of the purposeful acoustic signal generated by acoustic generator 12 and to produce an electric output signal on a line 28.

The electric output signal from acoustic receiver 14 is interpreted by signal processing means 16. Signal processing means 16 receives the electric output signal from line 28, augments the signal and filters out background noise and, using a mathematical algorithm, compares the signal with a predetermined normal signal. If the output signal differs from the predetermined normal signal by a value greater than a predetermined value, signal processing means 16 sends a signal through line 29 to a display means 30 indicating that sprinkler head 24 has fired. Display means 30 may be in the building being monitored or remote therefrom and may take a variety of forms including visual, audio or tactile. Line 29 through which signal processing means 16 sends a signal to display means 30 may be hard wired or wireless or some combination thereof. For example, display means may be visual (a blinking light, a flashing porch light, strobe lights, etc.), audio (a bell, whistle, etc.) or tactile (a telephone or pager vibrator, etc.). The signal from signal processing means 16 may be sent through an electrical line or telephone system or be radio transmitted to display means 30 which is observed by a party from whom a response is required such as a maintenance group, security service, fire station or the like.

Figure 4:
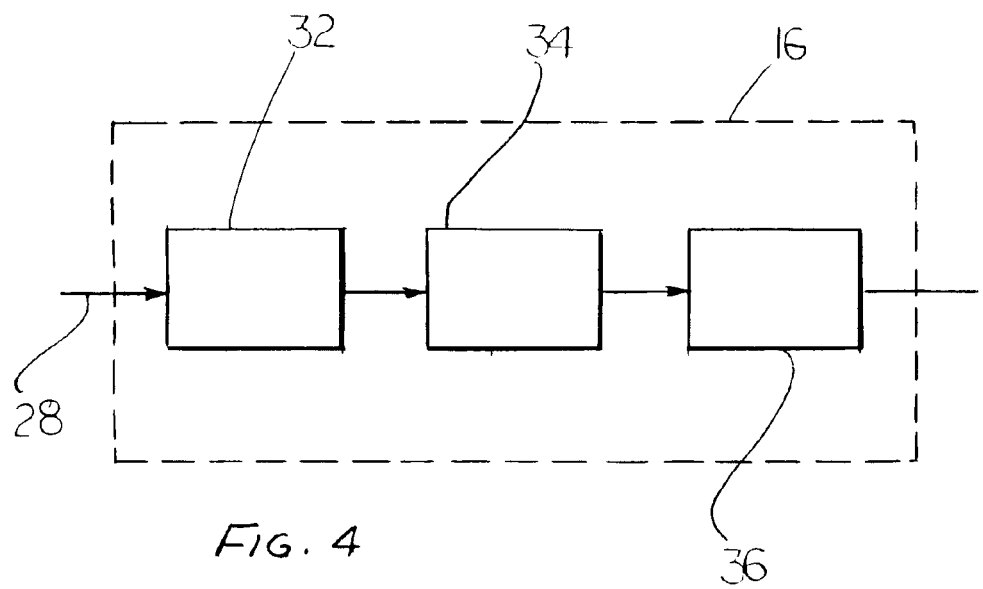

Since the signal from acoustic generator 12 is purposeful, signal processing means 16 can be made simpler and cheaper because the signal requires less filtering. As shown in FIG. 4, signal processing means 16 includes an amplifier and filter 32, an analog to digital converter 34 and a microprocessor 36. Amplifier and filter 32 amplify the signal from acoustic receiver 14 and remove frequency components not considered useful. The analog to digital converter periodically takes an instantaneous voltage measurement (i.e., "snapshot") from acoustic receiver 14 and gives that numerical value to microprocessor 36. Microprocessor 36 is programmed to analyze the digital signal received from converter 34 and makes an "alarm/no-alarm" decision. It can also be programmed to extract other information from the digital signal such as performing a spectral analysis of the frequency components of the acoustic signal received by acoustic receiver 14 to identify which sprinkler head 24 has fired. Since it is common to have maps of buildings on display annunciator panels, each sprinkler head 24 can be represented with an LED, or have a coded location associated with it for display. If each sprinkler head 24 has its own unique signal then signal processing means 16 can recognize and relate how many sprinkler heads are ignited, thus determining the location and size of the fire. This allows a determination of the required size of the response from the fire department and points them to the specific location of the problem in the building.

Acoustic generator 12 may be powered in a variety of manners by different drive means 38. For example, acoustic generator 12 may be activated by the water flowing through the pipe or the exit of the pipe. When acoustic generator 12 is a reed or other vibrating device with known resonant frequencies, the water flow through the pipe or exit of the pipe may be drive means 38 causing the acoustic generator to transmit a signal through the fluid flowing through the pipe. When acoustic generator 12 is a hammer for striking the pipe with known resonant frequencies, drive means 38 may be a vane, paddle wheel or the like turning in response to the fluid flowing through the pipe. As the member turns, the hammer may be driven or, if spring biased, released such that it strikes the pipe transmitting a signal through the fluid.

Another way of powering drive means 38 is to run electric wires for each acoustic generator 12 at each sprinkler head 24, perhaps daisy-chaining them together to minimize the amount of wire but this arrangement is costly and labor intensive. Drive means 38 can be powered with a battery, including a battery whose electrolyte is contained within a capsule which is activated by the fluid flowing through the pipe. Acoustic generator 12 can also be powered with "water-batteries" which provide a limited short duration of power when activated by the presence of water or by converting the mechanical energy of vibrating sprinkler head 24 into electrical energy for powering acoustic generator 12. Springs or other sources of stored energy may also be used, as may be vanes, paddle wheels or the like driven by the flowing fluid.

When drive means 38 is electrically powered, it can be switched by a second acoustic receiver 40 mounted on pipe network in a manner that second acoustic receiver 40 detects the shearing action of the fluid as it flows through the pipe or exit of the pipe. Second acoustic receiver 40 triggers drive means 38 which activates acoustic generator 12. Second acoustic receiver 40, like first acoustic receiver 14, may be an accelerometer, including piezoelectric, piezoresistive and electromagnetic types, as well as pressure transducers and microphones and such other acoustic receivers as will occur to those skilled in the art.

Figure 3:
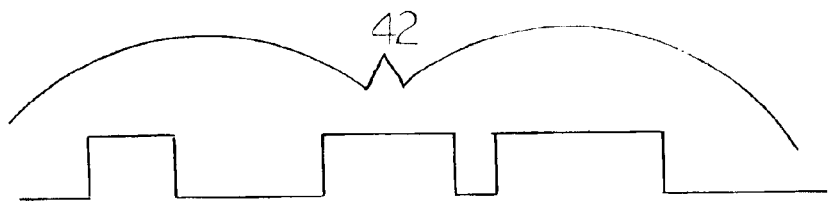
FIG. 3 is a schematic view of a representative wave form for encoding data; and, FIG. 4 is a schematic view of a signal processing means.

When drive means 38 is a piezoelectric transducer, drive means 38 may include an oscillator and an encoder chip with switches. The switches may be mechanical switches, solder connections, programmable memory states, etc. The oscillator produces a carrier signal which is modulated by the encoder chip to produce a distinctive wave form 42 as shown in FIG. 3 supplied to acoustic generator 12. Wave form 42 or a sequence of wave forms can be used as an "ID code" for identifying which sprinkler head 24 has been activated. The information in the "ID code" can be sent in a number of other ways, including multiple simultaneous tones wherein a combination of tones is used to identify the particular sprinkler head 24, its status, etc. A sequence of tones can be used to encode the information or one or more tones can be pulsed in one or more recognizable patterns. Shifting between tones or combinations in one more recognizable patterns can also be used.

Drive means 38 may include a microcontroller on a chip capable of generating a carrier and a data signal. The carrier signal may be generated in software by continuously looping through a routine with a controlled execution time. Alternatively, the microprocessor may have a pulse width modulation module or similar peripheral, in which case the carrier signal is generated by on-chip hardware. If either case, the data signal "gates" the carrier by switching the carrier pulse on and off at the data transmission rate. The data pulse on/off delays can be generated in software ("delay loops") or by means of on-chip hardware. In the case of a purely software drive means 38, the carrier and data signals are internal logic states created by stepping the program through different "states" at a carefully controlled rate. Wave form 42 providing the "ID code" for acoustic generator 12 can be programmed in-circuit when the device is manufactured. Drive means 38 can also be an application specific integrated circuit, with each chip having a unique "ID" stored in non-volatile memory.

Acoustic generator 12 may be acoustically coupled to sprinkler head 24 or close to sprinkler head 24 on coupling 26, conduit 22 or lateral pipe 20. As aforementioned, acoustic generator 12 may be intrusive or non-intrusive. If non-intrusive, existing sprinkler systems an be easily upgraded and retrofitted. In like manner, second acoustic receiver 40 and drive means 38 may be intrusive or non-intrusive and integrated with acoustic generator 12. Acoustic generator 12 may be designed to fit a standard sprinkler head coupling 26. Such couplings are commonly used to accommodate the attachment of sprinkler heads having varying water entry orifice sizes. Acoustic generator 12 may also be made a part of sprinkler head 24.

In use, apparatus 10 as described above can be used alone or in combination with a typical flow detector in an automatic fire sprinkler system or in other situations where the presence or absence of flow needs to be detected. Different levels of warning may be provided with a combination of systems. For example, a mechanical flow switch may be used to detect far lower amounts of flow than are necessary to trigger apparatus 10. The output from both systems can be provided to microprocessor 36 which can then send an appropriate signal to display means 30. If the flow is caused by a leak, only the system with the mechanical flow switch signals an, alarm and a notice may be sent to the maintenance crew. If microprocessor 36 receives an alarm signal from both systems, a notice is sent to the fire fighters and the signal from apparatus 10 is processed to provide them with information as to how big and where the fire is located in the building.

In view of the above, it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for monitoring fluid flow through a pipe or at the exit of a pipe, said device comprising, an acoustic generator acoustically coupled to the pipe or at the exit of the pipe, said acoustic generator activated by the fluid flowing through the pipe or the exit of the pipe and generating upstream acoustic vibrations in the fluid flowing through the pipe, said acoustic vibrations forming a purposeful acoustic signal, an acoustic receiver acoustically coupled to a remote upstream portion of the pipe, said acoustic receiver constructed to respond to at least a portion of the acoustic signal generated by the acoustic generator and to produce an electric output signal, a signal processing means arranged to receive the electric output signal from the acoustic receiver and to detect a deviation in said electrical output signal from a predetermined normal signal by a value greater than a predetermined value indicating a fault in the flow of fluid through the pipe or at the exit of the pipe, and a display means for indicating said fault.

2. The apparatus of claim 1 wherein the acoustic generator is powered by a drive means switched by a second acoustic receiver in response to acoustic vibrations of the fluid flowing through the pipe or exit of the pipe.

3. The apparatus of claim 1 wherein the acoustic generator is capable of sending acoustic signals which are encoded in a manner to identify the acoustic generator.

4. The apparatus of claim 3 wherein the signals are encoded with a distinctive wave form or a sequence of wave forms.

5. The apparatus of claim 3 wherein the signals are encoded with a combination of frequencies.

6. The apparatus of claim 3 wherein the signals are encoded with a sequence of different frequencies.

7. An apparatus for monitoring fluid flow through a pipe or at the exit of a pipe, said device comprising:

an acoustic piezoelectric transducer generator acoustically coupled to the pipe or at the exit of the pipe, said acoustic generator activated by the fluid flowing through the pipe or the exit of the pipe and generating upstream acoustic vibrations in the fluid flowing through the pipe, said acoustic vibrations forming a purposeful acoustic signal, an acoustic piezoelectric transducer receiver acoustically coupled to a remote upstream portion of the pipe, said acoustic receiver constructed to respond to at least a portion of the acoustic signal generated by the acoustic generator and to produce an electric output signal, a signal processing means arranged to receive the electric output signal from the acoustic receiver and to detect a deviation in said electrical output signal from a predetermined normal signal by a value greater than a predetermined value indicating a fault in the flow of fluid through the pipe or at the exit of the pipe, and a display means for indicating said fault.

8. The apparatus of claim 7 wherein the signal processing means includes an amplifier and filter for augmenting the signal and filtering out background noise, an analog to digital converter for transforming the output from the amplifier and filter into a digital signal and a microprocessor which is programmed with a mathematical algorithm for interpreting the digital signal and making an alarm/no alarm decision which is outputted to the display means.

9. The apparatus of claim 7 wherein the acoustic generator is capable of sending purposeful acoustic signals which are encoded in a manner to identify the acoustic generator.

10. The apparatus of claim 9 wherein a plurality of acoustic generators are acoustically coupled to the pipe or the exit of the pipe and the signal sent by each acoustic generator is unique.

11. A method for monitoring fluid flow through a pipe or at the exit of a pipe, said method comprising:

acoustically coupling an acoustic generator to the pipe or the exit of the pipe to be monitored for fluid flow, said acoustic generator capable of being activated by the fluid flowing through the pipe or the exit of the pipe and generating upstream acoustic vibrations in the fluid flowing through the pipe, said acoustic vibrations forming a purposeful acoustic signal;

acoustically coupling an acoustic receiver to a remote upstream portion of the pipe, said acoustic receiver capable of responding to at least a portion of the acoustic signal generated by the acoustic generator and producing an electric output signal, the acoustic generator sending an acoustic signal to the acoustic receiver through the fluid flowing through the pipe;

the acoustic receiver receiving the acoustic signal and producing an electric output signal;

receiving the electric output signal in a signal processing means capable of determining whether the signal deviates from a predetermined normal signal by a value greater than a predetermined value indicating a fault in the flow of fluid through the pipe or at the exit of the pipe; and, displaying the results as an alarm or no alarm condition.

12. The method of claim 11 wherein the pipe has a plurality of exits and an acoustic generator is acoustically coupled to the pipe at or near each exit, each said acoustic generator capable of sending an acoustic signal which can be distinguished from the acoustic signal sent by the other acoustic generators by the signal processing means; said method further comprising the step of analyzing the electric output signal in the signal processing means to determine which acoustic generator or combination of acoustic generators sent acoustic signals whereby the location and extent of the fault can be determined.

13. The method of claim 11 wherein the acoustic generator and acoustic receiver are piezoelectric transducers.

14. The method of claim 13 wherein the acoustic generator and the acoustic receiver are coupled non-intrusively on the pipe or exit of the pipe.

15. The method of claim 13 wherein the pipe is in an automatic fire sprinkler system having a main pipe and lateral pipes and the exit is a plurality of sprinkler heads, each of which is connected to one of the lateral pipes by a coupling, each acoustic generator acoustically coupled intrusively or non-intrusively to one of the couplings or sprinkler heads and the acoustic generator acoustically coupled to the main pipe.

16. A system for detecting fluid flow in a fire sprinkler system comprising:

a fire sprinkler system including at least one pipe and at least one sprinkler head;

a fluid in said at least one pipe;

an acoustic generator acoustically coupled to at least one of said pipe and said sprinkler head, said acoustic generator generating a purposeful acoustic signal in response to said fluid being ejected from said pipe via said sprinkler head, said purposeful acoustic signal being propagated in said fluid; and an acoustic receiver acoustically coupled to said pipe, said acoustic receiver constructed to respond to at least a portion of said purposeful acoustic signal generated by the acoustic generator.

17. The system of claim 16 wherein said system comprises a plurality of sprinkler heads and an acoustic generator associated with each of said sprinkler heads.

18. The system of claim 17 wherein each of said acoustic generators generates a different purposeful acoustic signal.

19. An apparatus for monitoring fluid flow in a pipe, said device comprising, a plurality of acoustic generators acoustically coupled to said pipe, said acoustic generators activated by the fluid flowing through said pipe, and each of said acoustic generators generating a purposeful acoustic signal in response to said fluid flowing through said pipe and emitting said purposeful acoustic signal into said fluid flowing through said pipe;

an acoustic receiver acoustically coupled to said pipe at a point remote from said acoustic generators, said acoustic receiver constructed to respond to at least a portion of said acoustic signal generated by said acoustic generators;

a microprocessor coupled to said acoustic receiver, said microprocessor being able to determine which of said plurality of acoustic generators generated said acoustic signal based on the acoustic signal received by said acoustic receiver; and a display coupled to said microprocessor for displaying which of said acoustic generators generated said acoustic signal.

* * * * *